(12) United States Patent
Yamaguchi et al.

(10) Patent No.: US 10,354,785 B2
(45) Date of Patent: Jul. 16, 2019

(54) PASSIVE THERMAL SWITCH DEVICES HAVING THERMAL SWITCH MATERIAL THAT PASSIVELY SWITCHES BETWEEN A THERMAL INSULATING STATE AND A THERMAL CONDUCTING STATE AND VEHICLES HAVING THE SAME

(71) Applicants: Toyota Jidosha Kabushiki Kaisha, Toyota-shi, Aichi-ken (JP); Toyota Motor Engineering & Manufacturing North America, Inc., Erlanger, KY (US)

(72) Inventors: Takeo Yamaguchi, Shizuoka (JP); Gaohua Zhu, Ann Arbor, MI (US)

(73) Assignees: Toyota Jidosha Kabushiki Kaisha, Toyota-shi, Aichi-ken (JP); Toyota Motor Engineering & Manufacturing North America, Inc., Plano, TX (US)

(*) Notice: Subject to any disclaimer, the term of this patent is extended or adjusted under 35 U.S.C. 154(b) by 69 days.

(21) Appl. No.: 15/591,854

(22) Filed: May 10, 2017

(65) Prior Publication Data
US 2018/0330903 A1    Nov. 15, 2018

(51) Int. Cl.
| H01H 37/58 | (2006.01) |
| H01F 1/147 | (2006.01) |
| G01K 7/38 | (2006.01) |
| B60L 58/26 | (2019.01) |

(52) U.S. Cl.
CPC .......... *H01F 1/14708* (2013.01); *B60L 58/26* (2019.02); *G01K 7/38* (2013.01); *H01H 37/58* (2013.01)

(58) Field of Classification Search
CPC .......... H01H 37/58; H01H 2231/026; H01H 2235/01; H01F 1/14708; H05K 7/2039; H05K 7/2049; G01K 7/38; B60L 58/26
USPC ..... 337/298, 304; 361/679.54, 697, 709–711
See application file for complete search history.

(56) References Cited

U.S. PATENT DOCUMENTS

| 3,383,487 | A  | * | 5/1968  | Wiener ................. H01H 13/02 200/292 |
| 4,908,731 | A  |   | 3/1990  | Richeson, Jr. |
| 5,477,676 | A  | * | 12/1995 | Benson ................... B64G 1/22 165/96 |
| 6,829,145 | B1 | * | 12/2004 | Corrado .............. H01L 23/4006 165/185 |
| 7,271,981 | B2 |   | 9/2007  | Ju et al. |

(Continued)

FOREIGN PATENT DOCUMENTS

JP    2004336839 A    11/2004

*Primary Examiner* — Jacob R Crum
(74) *Attorney, Agent, or Firm* — Dinsmore & Shohl LLP

(57) ABSTRACT

A passive thermal switch device, for regulating a temperature of a thermal component configured to generate heat, includes a first plate and a second plate. The first plate is provided on the thermal component. The first plate includes a thermal switch material that switches from an antiferromagnetic state to a ferromagnetic state upon exceeding a state transition temperature. The second plate includes a permanent magnet. The second plate is moveable between a thermal insulator position and a thermal conductor position based on a temperature of the thermal switch material. In the thermal insulator position, the second plate is spaced apart from the first plate. In the thermal conductor position, the second plate is in contact with the first plate.

18 Claims, 4 Drawing Sheets

(56) References Cited

U.S. PATENT DOCUMENTS

| | | | |
|---|---|---|---|
| 8,096,119 B2 | 1/2012 | Baughman et al. | |
| 8,110,396 B2 | 2/2012 | Bommer et al. | |
| 2004/0150504 A1* | 8/2004 | Nicholson | H01H 37/58 337/54 |
| 2005/0237140 A1* | 10/2005 | Rostaing | H01F 7/1646 335/229 |
| 2005/0275500 A1* | 12/2005 | Dietz | F25D 19/006 337/298 |
| 2009/0230335 A1* | 9/2009 | Ocalan | E21B 34/06 251/14 |
| 2012/0148881 A1* | 6/2012 | Quisenberry | B60L 11/1879 429/50 |
| 2014/0235448 A1* | 8/2014 | Aley | G01R 33/387 505/162 |
| 2015/0211814 A1* | 7/2015 | Quinn | F28F 13/06 165/86 |
| 2016/0233143 A1* | 8/2016 | Sporer | H01L 23/367 |
| 2016/0265855 A1* | 9/2016 | Clarke | F28F 13/00 |

* cited by examiner

PASSIVE THERMAL SWITCH DEVICES HAVING THERMAL SWITCH MATERIAL THAT PASSIVELY SWITCHES BETWEEN A THERMAL INSULATING STATE AND A THERMAL CONDUCTING STATE AND VEHICLES HAVING THE SAME

TECHNICAL FIELD

The present specification generally relates to thermal switch devices for regulating a temperature of heat generation components and, more specifically, thermal switch devices having a thermal switch material that passively switches between an antiferromagnetic state and a ferromagnetic state, based on a temperature of the thermal switch material, which passively switches the passive thermal switch device between a thermal insulating state and a thermal conducting state.

BACKGROUND

It is known to provide cooling devices to transfer heat (thermal energy) away from a heat generating component. However, the known cooling devices are typically fixed in a thermal conducting state such that heat generated by the heat generating component is transferred to the cooling device and drawn away from the heat generating component.

Certain heat generating components operate at a reduced efficiency when the component's temperature is below an intended operating temperature. As such, it is important that the component reaches the intended operating temperature as soon as possible to reduce the inefficiency. Moreover, once the component has reached the intended operating temperature, it is important for the cooling system to be able to remove any excess heat from the component. However, as the previously known cooling devices are typically fixed in a thermal conducting state, the heat generated by the heat generating component is removed by the cooling devices even before the component can reach its intended operating temperature. Therefore, the time in which the component operates with the reduced efficiency before reaching the intended operating temperature is increased.

Accordingly, a need exists for alternative devices for regulating a temperature of a thermal component which passively switches between a thermal insulator to a thermal conductor based on temperature.

SUMMARY

In one embodiment, a passive thermal switch device, for regulating a temperature of a thermal component configured to generate heat, includes a first plate and a second plate. The first plate is provided on the thermal component. The first plate includes a thermal switch material that switches from an antiferromagnetic state to a ferromagnetic state upon exceeding a state transition temperature. The second plate includes a permanent magnet. The second plate is moveable between a thermal insulator position and a thermal conductor position based on a temperature of the thermal switch material. In the thermal insulator position, the second plate is spaced apart from the first plate. In the thermal conductor position, the second plate is in contact with the first plate.

When the temperature of the thermal switch material is less than the state transition temperature, the thermal switch material is in the antiferromagnetic state and the second plate is spaced apart from the first plate as the permanent magnet of the second plate is not magnetically attracted to the thermal switch material. When the temperature of the thermal switch material is greater than the state transition temperature, the thermal switch material is in the ferromagnetic state and the second plate is in contact with the first plate as the permanent magnet of the second plate is magnetically attracted to the thermal switch material.

In another embodiment, a vehicle includes a thermal component, a first plate, and a second plate. The thermal component configured to generate heat. The first plate is provided on the thermal component. The first plate includes a thermal switch material that switches from an antiferromagnetic state to a ferromagnetic state upon exceeding a state transition temperature. The second plate includes a permanent magnet. The second plate is moveable between a thermal insulator position and a thermal conductor position based on a temperature of the thermal switch material. In the thermal insulator position, the second plate is spaced apart from the first plate. In the thermal conductor position, the second plate is in contact with the first plate.

When the temperature of the thermal switch material is less than the state transition temperature, the thermal switch material is in the antiferromagnetic state and the second plate is spaced apart from the first plate as the permanent magnet of the second plate is not magnetically attracted to the thermal switch material. When the temperature of the thermal switch material is greater than the state transition temperature, the thermal switch material is in the ferromagnetic state and the second plate is in contact with the first plate as the permanent magnet of the second plate is magnetically attracted to the thermal switch material.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
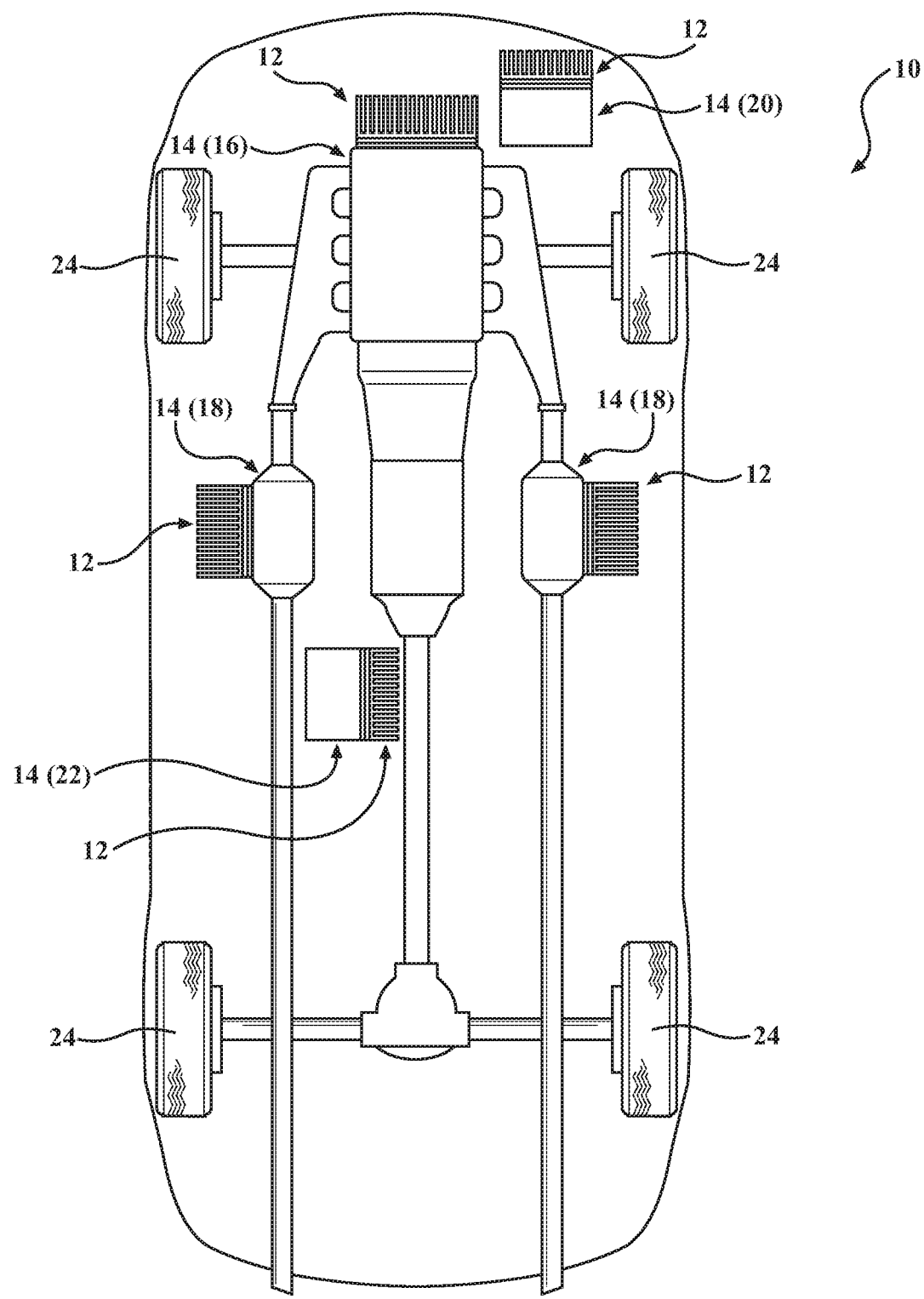
FIG. 1 schematically depicts an environment of a passive thermal switch device which passively switches between a thermal insulating state and a thermal conducting state based on temperature, according to one or more embodiments shown and described herein.

FIG. 1 generally depicts an embodiment of a passive thermal switch device for regulating a temperature of a thermal component configured to generate heat (thermal energy). Various embodiments of the passive thermal switch device and the operation of the passive thermal switch device are described in more detail herein.

Embodiments disclosed herein include passive thermal switch devices for passively regulating a temperature of a thermal component. Specifically, the passive thermal switch devices regulate the temperature of the thermal component by passively switching between a thermal insulating state and a thermal conducting state based upon temperature. In the thermal insulating state, the passive thermal switch devices reduce thermal energy transfer (loss) from the thermal component. In the thermal conducting state, the passive thermal switch devices increase thermal energy transfer (loss) from the thermal component. The passive thermal switch device passively switches between the thermal insulating state and the thermal conducting state without any external forces or actions other than temperature of the thermal component. Specifically, no external mechanical or electronic actions are required to switch passive thermal switch device between the thermal insulating state and the thermal conducting state.

The passive thermal switch devices are provided in the thermal insulating state during a cold start condition of the thermal component such that thermal energy generated by the thermal component is retained in thermal component. As such, the passive thermal switch devices in the thermal insulating state allow for the temperature of the thermal component to increase quickly during a cold start (i.e. below a predetermined operating temperature). The passive thermal switch devices are passively switched from the thermal insulating state to the thermal conducting state once the thermal component exceeds the predetermined operating temperature. Further, the passive thermal switch devices in the thermal conducting state allow for the thermal component to transfer excess thermal energy after exceeding the predetermined operating temperature.

In some embodiments, the passive thermal switch devices include a first plate attached to the thermal component and a second plate moveable with respect to the first plate. The first plate includes a thermal switch material that undergoes a reversible solid-state magnetic state transformation between an antiferromagnetic state and a ferromagnetic state based on temperature. The second plate includes a permanent magnet.

Specifically, the thermal switch material is in the antiferromagnetic state when the temperature of the thermal switch material is less than a state transition temperature. The thermal switch material is in the ferromagnetic state when the temperature of the thermal switch material is equal to or greater than the state transition temperature.

The passive thermal switch devices regulate the temperature of the thermal component by switching between the thermal insulating state and the thermal conducting state based on the temperature of the thermal switch material. As the first plate having the thermal switch material is attached to the thermal component, the temperature of the thermal switch material generally corresponds to the temperature of the thermal component. As will be described in greater detail below, the predetermined state transition temperature is set to substantially correspond to the predetermined operating temperature. Therefore, the thermal switch material passively switches between the antiferromagnetic state and the ferromagnetic state based on the temperature of the thermal switch material (i.e. the temperature of the thermal component).

The second plate is moveable between a thermal insulator position and a thermal conductor position to move the passive thermal switch device between the thermal insulating state and the thermal conducting state, respectively. Specifically, when the temperature of the thermal switch material is less than the predetermined state transition temperature, the thermal switch material is in the antiferromagnetic state and the permanent magnet is not magnetically attracted to the thermal switch material. As there is no magnetic attraction between the thermal switch material in the antiferromagnetic state and the permanent magnet, the passive thermal switch device is in the thermal insulating state. In the thermal insulating state, the second plate is in the thermal insulating position in which the second plate is spaced apart from the first plate to reduce the amount of thermal energy transfer between the first plate and the second plate.

When the temperature of the thermal switch material is equal to or greater than the predetermined state transition temperature, the thermal switch material is in the ferromagnetic state and the permanent magnet is magnetically attracted to the thermal switch material. Due to the magnetic attraction between the thermal switch material in the ferromagnetic state and the permanent magnet, the passive thermal switch device is in the thermal conducting state. In the thermal conducting state, the second plate is in the thermal conductor state in which the second plate is in contact with the first plate to increase the amount of thermal energy transfer between the first plate and the second plate. Specifically, upon the change of the thermal switch material from the antiferromagnetic state to the ferromagnetic state, the magnetic attraction between the permanent magnet in the second plate and the thermal switch material in the ferromagnetic state moves the second plate from being spaced apart from the first plate to be in contact with the first plate.

During an initial operation or cold start of the thermal component, it is beneficial to quickly raise the temperature of the thermal component to the predetermined operating temperature. As the passive thermal switch device is in the thermal insulating state when the temperature of the thermal component is less than the predetermined operating temperature, thermal energy transfer from the first plate to the second plate is reduced as the second plate is spaced apart from the first plate. Therefore, the reduction in the thermal energy transfer from the first plate attached to the thermal component aids in quickly raising the temperature of the thermal component.

Once the thermal component has been operating for a sufficient time, the temperature raises to be equal to or greater than the predetermined operating temperature. At the predetermined operating temperature, the thermal switch material is at the predetermined state transition temperature and switches from the antiferromagnetic state to the ferromagnetic state. In the ferromagnetic state, the second plate is brought in contact with the first plate due to the magnetic attraction between the thermal switch material, in the first plate, and the permanent magnet in the second plate. As the first plate is attached to the thermal component, excess thermal energy from thermal component can be transferred from the thermal component to the second plate through the first plate. By allowing the transfer of excess thermal energy, overheating of the thermal component can be prevented.

In some other embodiments, the passive thermal switch devices include a biasing member connected to the first plate and the second plate. The biasing member biases the second plate to be spaced apart from the first plate. When the thermal switch material is in the antiferromagnetic state, there is no magnetic attraction between the first plate and the second plate. As such, the biasing member biases the second plate to be spaced apart from the first plate. When the thermal switch material is in the ferromagnetic state, the magnetic attraction between the thermal switch material and the permanent magnet of the second plate overcomes the biasing force of the biasing member and brings the second plate into contact with the first plate.

In some other embodiments, the passive thermal switch devices include a heat sink attached to the second plate. The heat sink is configured to dissipate thermal energy transferred from the thermal component to the second plate through the first plate.

Referring now to the drawings, FIG. 1 schematically depicts a vehicle 10 having a plurality of thermal switch devices 12. The passive thermal switch devices 12 are provided on various thermal components 14 within the vehicle 10. The thermal components 14 are vehicle components configured to generate heat (thermal energy) during operation. The thermal components 14 operate with an inefficiency when a temperature of the thermal component 14 is less than a predetermined operating temperature.

For example, the thermal components 14 are optionally an internal combustion engine 16, exhaust gas purification devices 18, and/or an electric power storage device, specifically a battery 20 and/or a secondary battery 22. The exhaust gas purification devices 18 are provided in an exhaust passage of the internal combustion engine 16. Specifically, the exhaust purification devices 18 are optionally catalytic converters, NOx storage catalysts, selective catalytic converters, two-way catalytic converters, or three-way catalytic converters. The battery 20 is provided in the vehicle 10 to power electronic accessories and the secondary battery (fuel cell stack) 22 is provided to supply electrical power to a motor/generator (not shown) which provides driving power to driving wheels 24 of the vehicle 10.

It is appreciated, of course, that the thermal component 14 is not limited to a component provided on a vehicle 10. Rather, the thermal component 14 optionally includes other types of components unassociated with a vehicle which generate heat during operation and which operate with an inefficiency when a temperature is less than a predetermined operating temperature. For example, the thermal component 14 is optionally an internal combustion engine of an electrical generator, computer components, or other electronic components. As such, the thermal component 14 is optionally provided on any type of component which generates heat during operation and which operate with an inefficiency when a temperature of the thermal component 14 is less than a predetermined operating temperature. Specifically, the thermal component 14 is optionally any type of component in which it is beneficial to reduce the amount of thermal energy transfer during an initial operating and increase the amount of thermal energy transfer when the temperate exceeds the predetermined operating temperature.

Figure 2B:
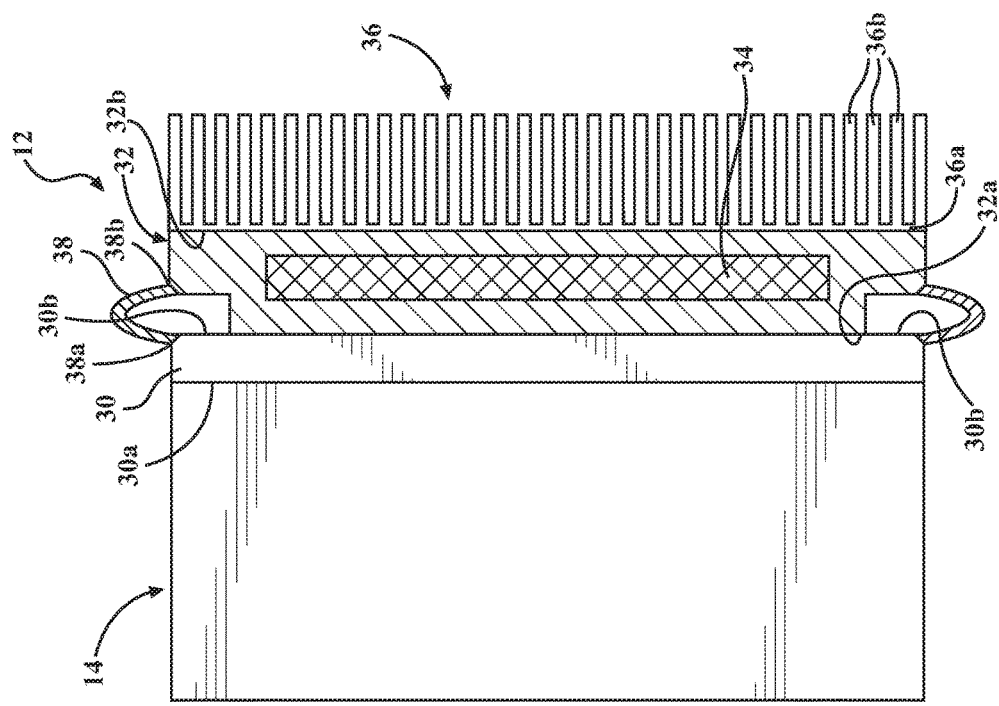
FIG. 2B schematically depicts a partial cross-sectional view of a passive thermal switch device in a thermal conducting state, according to one or more embodiments shown and described herein.
Figure 2A:
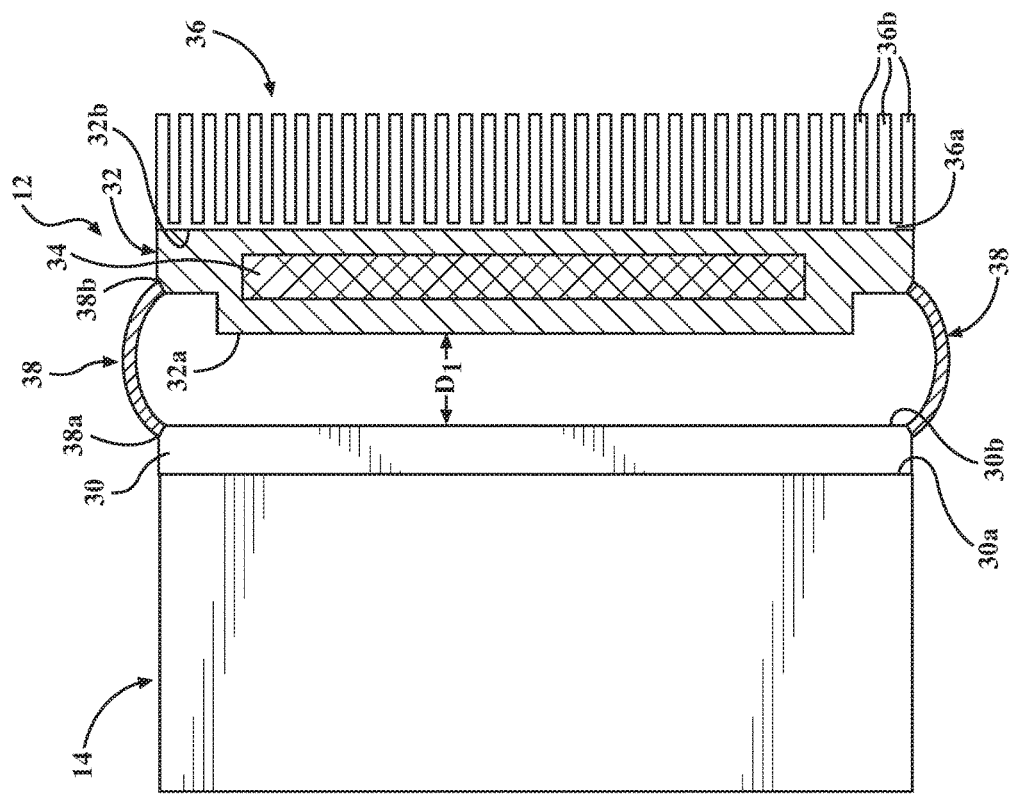
FIG. 2A schematically depicts a partial cross-sectional view of a passive thermal switch device in a thermal insulating state, according to one or more embodiments shown and described herein.

With reference to FIGS. 2A and 2B, the passive thermal switch device 12 will be described in greater detail. The passive thermal switch device 12 includes a first plate 30, a second plate 32, a permanent magnet 34, a heat sink 36, and a biasing member 38.

The first plate 30 is formed either partially or entirely of a thermal switch material undergoes a reversible solid-state magnetic state transformation between the antiferromagnetic state and the ferromagnetic state based on a temperature. Specifically, the thermal switch material is in the antiferromagnetic state when the temperature of the thermal switch material is less than the predetermined state transition temperature. The thermal switch material is in the ferromagnetic state when the temperature of the thermal switch materials is equal to or greater than the state transition temperature. Further, the thermal switch material switches from the antiferromagnetic state to the ferromagnetic state when the temperature of the thermal switch material becomes equal to or greater than the state transition temperature. Further still, the thermal switch material switches from the ferromagnetic state to the antiferromagnetic state when the temperature of the thermal switch material becomes less than the state transition temperature.

As used herein the term the "thermal switch material" refers to a category of metallic or alloy materials having magnetic properties which undergo reversible solid-state magnetic state transformation between the antiferromagnetic state and the ferromagnetic state based on a temperature, specifically, the magnetic proprieties change from antiferromagnetic (non-magnetic), at temperatures below a predetermined state transition temperature, to ferromagnetic (magnetic), at temperatures equal to or greater than the predetermined state transition temperature.

As used herein the term "alloy" refers to a solid solution alloy and an intermetallic compound unless expressly described otherwise. As used herein the term "intermetallic compound" refers to an alloy with a defined stoichiometry and crystal structure.

For example, the thermal switch material is optionally any one of manganites, Manganese-Iron-Nickle-Germanium alloys ($Mn_{1-x}Fe_xNiGe$), Manganese-Chromium-Cobalt-Germanium alloys ($Mn_{1-x}Cr_xCoGe$), Nickle-Manganese-Indium alloys ($Ni_{50}Mn_{34}In_{16}$), Cerium-Iron alloys ($CeFe_2$), Hafnium-Tantalum-Iron alloys ($Hf_{0.8}Ta_{0.2}Fe_2$), Iron-Rhodium alloys (FeRh), Manganese-Antimony alloys ($Mn_2Sb$) and other Manganese-Antimony alloys (MnSb).

For example, the thermal switch material is optionally an Iron-Rhodium alloy (FeRh) which has a predetermined state transition temperature of 350° K (77° C.). Therefore, the thermal switch material for either partially or entirely of an Iron-Rhodium alloy is in an antiferromagnetic state at temperatures less than 350° K (77° C.), and which switches to a ferromagnetic state at temperatures above 350° K (77° C.). As such, an Iron-Rhodium alloy (FeRh) is selected as a thermal switch material for a thermal component 14 having a predetermined operating temperature substantially corresponding to 350° K (77° C.). Specifically, the Iron-Rhodium (FeRh) alloy is selected as the thermal switch material as the Iron-Rhodium (FeRh) alloy has a predetermined state transition temperature that substantially corresponds to the predetermined operating temperature of the thermal component 14.

In some embodiments, the predetermined state transition temperature substantially corresponds to the predetermined operating temperature when the predetermined state transition temperature is within ±20° K (±20° C.) of the predetermined operating temperature of the thermal component 14. In some other embodiments, the predetermined state transition temperature substantially corresponds to the predetermined operating temperature when the predetermined state transition temperature is within ±10° K (±10° C.) of the predetermined operating temperature of the thermal component 14. In some other embodiments, the predetermined state transition temperature substantially corresponds to the predetermined operating temperature when the predetermined state transition temperature is within ±5° K (±5° C.) of the predetermined operating temperature of the thermal component 14.

Further, the thermal switch material is optionally formed of any single or any combination of metallic materials or alloy materials having magnetic properties which undergo reversible solid-state magnetic state transformation between the antiferromagnetic state and the ferromagnetic state based on a temperature, specifically, the magnetic proprieties change from antiferromagnetic (non-magnetic), at temperatures below a predetermined state transition temperature, to ferromagnetic (magnetic), at temperatures equal to or greater than the predetermined state transition temperature.

As the various thermal switch materials each have different predetermined state transition temperatures, the predetermined state transition temperature is selectively varied by combining different thermal switch materials to select a specific predetermined state transition temperature that substantially corresponds to a required predetermined operating temperature for a specific thermal component 14. Specifically, the thermal switch material that partially or entirely forms the first plate 30 is selected to have a predetermined state transition temperature that substantially corresponds to the predetermined operating temperature of the specific thermal component 14. For example, the thermal switch material of the first plate 30 attached to the internal combustion engine 16 is selected to have a predetermined state transition temperature that substantially corresponds to the predetermined operating temperature of the internal combustion engine 16. Further, the thermal switch material of the first plate 30 attached to the exhaust gas purification device 18 is selected to have a predetermined state transition temperature that substantially corresponds to the predetermined operating temperature of the exhaust gas purification device 18, which in some embodiments is different from the predetermined operating temperature of the internal combustion engine 16.

With reference to FIG. 2A, the first plate 30 includes an attachment surface 30a and an opposite first contact surface 30b. The attachment surface 30a is attached or otherwise fixed to a portion of the thermal component 14. The second plate 32 includes a second contact surface 32a and an opposite cooling surface 32b. A heat sink 36 is attached to the second plate 32. Specifically, the heat sink 36 includes a plate member 36a and a plurality of spaced apart fins 36b extending outwardly from the plate member 36a. The plate member 36a is attached to the cooling surface 32b of the second plate 32. The heat sink 36 dissipates thermal energy into the surrounding environment.

The second plate 32 includes the permanent magnet 34. In some embodiments, the permanent magnet 34 is formed as a core of the second plate 32. Specifically, the second plate 32 is molded around the permanent magnet 34 such that the permanent magnet 34 is entirely encased therein. The second plate 32 is formed of a material having a high thermal conductivity such that the second plate 32 effectively transfers thermal energy from the thermal component 14, through the first plate 30, to the heat sink 36. For example, the second plate 32 is optionally formed of Copper (Cu), a Copper (Cu) alloy, or any other metallic material or alloy having a high thermal conductivity.

The biasing member 38 is formed of a resilient elastic material, for example, a rubber material. The biasing member 38 includes a first end 38a and an opposite second end 38b. The first end 38a is attached to the first plate 30 and the second end 38b is attached to the second plate 32. The biasing member 38 exerts a predetermined biasing force to bias the second plate 32 to be spaced apart from the first plate 30 by a predetermined distance D1. Specifically, the first contact surface 30b of the first plate 30 is spaced apart from the second contact surface 32a of the second plate 32 by the predetermined distance D1.

It is appreciated, of course, that the passive thermal switch device 12 includes one or a plurality of biasing members 38 provided at various positions between the first plate 30 and the second plate 32.

In some embodiments, the space between the first contact surface 30b of the first plate 30 and the second contact surface 32a of the second plate 32 is in fluid communication with the surrounding environment. Specifically, air fills the space between the first plate 30 and the second plate 32. In some other embodiments, the space between the first plate 30 and the second plate 32 is under a vacuum. Specifically, a vacuum housing (not shown) seals the first plate 30 and the second plate 32 under a vacuum while exposing the heat sink 36 and at least a portion of the thermal component 14 that is not covered by the first plate 30.

With reference to FIG. 2A, the passive thermal switch device 12 is in a thermal insulating state. Specifically, the temperature of the thermal switch material is less than the predetermined state transition temperature such that the thermal switch material is in the antiferromagnetic state. As the permanent magnet 34 of the second plate 32 is not magnetically attracted to the thermal switch material of the first plate 30, the biasing member 38 exerts the predetermined biasing force against the second plate 32. Specifically, the biasing member 38 biases the second plate 32 to be in the thermal insulating position in which the second plate 32 is spaced apart from the first plate 30 by a predetermined distance D1.

As the second plate 32 is spaced apart from the first plate 30 in the thermal insulating position, the amount of thermal energy transfer between the thermal component 14 to the second plate 32, through the first plate 30, is reduced. Therefore, the passive thermal switch device 12 is in the thermal insulating state to allow for thermal energy (i.e. heat) generated by the thermal component 14 be retained by the thermal component 14 to raise the temperature to the predetermined operating temperature.

With reference to FIG. 2B, after operation of the thermal component 14 for a sufficient period of time, the temperature of the thermal component 14 reaches or exceeds the predetermined operating temperature. As the predetermined state transition temperature of the thermal switch material is selected to substantially correspond to the predetermined operating temperature of the thermal component, the thermal switch material of the first plate 30 consequently reaches or exceeds the predetermined state transition temperature.

As shown in FIG. 2B, the passive thermal switch device 12 switches from the thermal insulating state to the thermal conducting state. Specifically, as the temperature of the thermal switch material becomes equal to or greater than the predetermined state transition temperature, the thermal switch material passively switches from the antiferromagnetic state to the ferromagnetic state. As the permanent magnet 34 of the second plate 32 is magnetically attracted to the thermal switch material in the ferromagnetic state, the magnetic attraction overcomes the predetermined biasing force of the biasing member 38. The magnetic attraction between the thermal switch material in the ferromagnetic state and the permanent magnet 34 moves the second plate 32 from the thermal insulator position to the thermal conductor position.

Specifically, the magnetic attraction between the thermal switch material in the ferromagnetic state and the permanent magnet 34 brings the second contact surface 32a of the second plate 32 in contact with the first contact surface 30b of the first plate 30. As the second plate 32 is in contact with the first plate 30, the transfer of thermal energy from the thermal component 14 is increased. Thermal energy from the thermal component is transferred between the first plate 30 to the second plate 32. The thermal energy is transferred through the second plate 32 to the heat sink 36 as the second plate 32 is formed of a material having a high thermal conductivity. The thermal energy is then dissipated by the heat sink 36, so as to prevent the thermal component 14 from overheating.

Figure 3B:
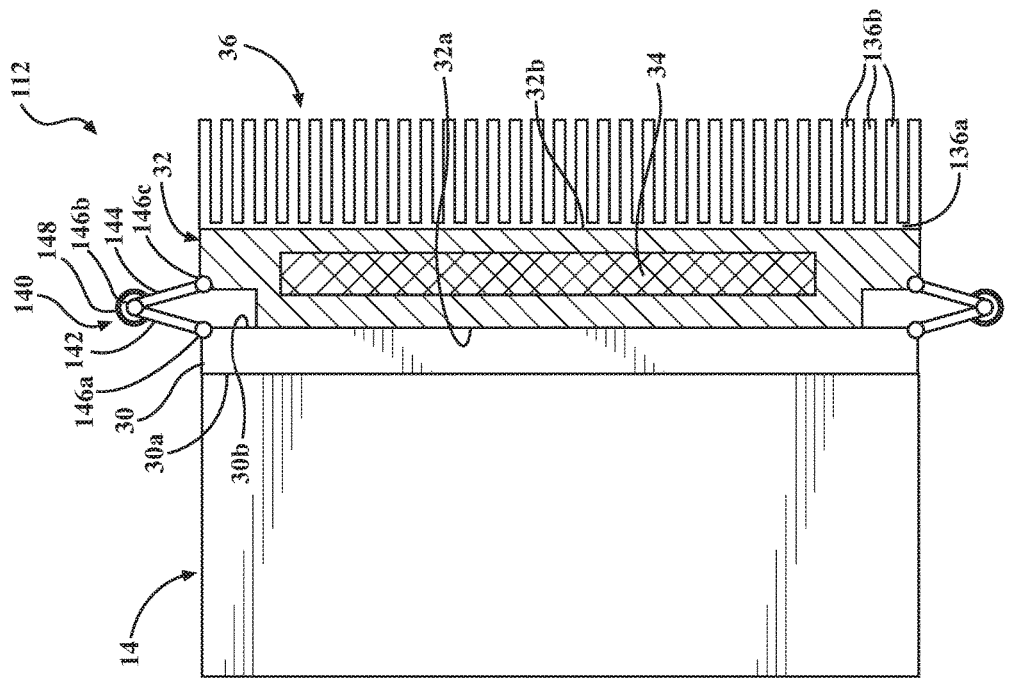
FIG. 3B schematically depicts a partial cross-sectional view of a passive thermal switch device in a thermal conducting state, according to one or more embodiments shown and described herein.
Figure 3A:
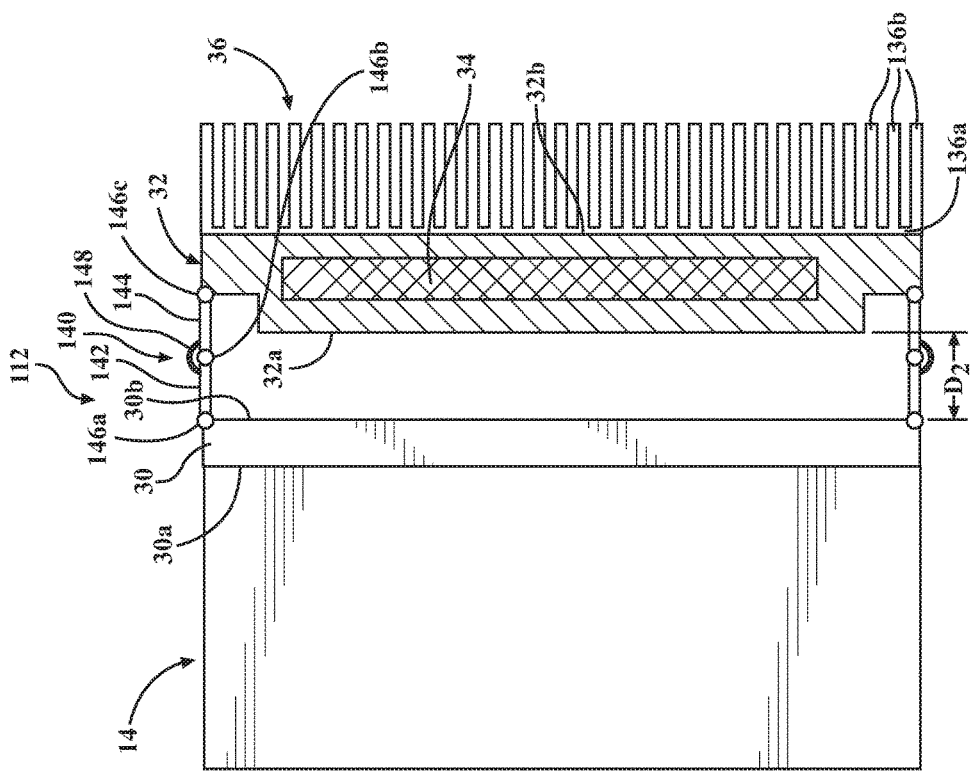
FIG. 3A schematically depicts a partial cross-sectional view of a passive thermal switch device in a thermal insulating state, according to one or more embodiments shown and described herein.

Referring to FIGS. 3A and 3B, a passive thermal switch device for regulating a temperature of a thermal component 14 is generally illustrated at 112. The passive thermal switch device 112 is similar to the passive thermal switch device 12, except that the passive thermal switch device 112 includes a biasing member 140.

The biasing member 140 is formed of a first arm 142, a second arm 144, a pivot joints 146a, 146b, 146c, and a resilient elastic material 148. The first arm 142 is attached to the first plate 30 by the pivot joint 146a. The second arm 144 is attached to the second plate 32 by pivot joint 146c. The first arm 142 is attached to the second arm 144 by pivot joint 146b. The resilient elastic material 148 has one end attached to the first arm 142 and an opposite end attached to the second arm 144.

With reference to FIG. 3A, the resilient elastic material 148 is biased towards a contracted position in which the resilient elastic material 148 exerts a predetermined biasing force to bias the second plate 32 into the thermal insulator position. The resilient elastic material 148 exerts the predetermined biasing force to bias the second plate 32 to be spaced apart from the first plate 30 by a predetermined distance D2. Specifically, the first contact surface 30b of the first plate 30 is spaced apart from the second contact surface 32a of the second plate 32 by a predetermined distance D2.

It is appreciated, of course, that the passive thermal switch device 12 includes one or a plurality of biasing members 140 provided at various positions between the first plate 30 and the second plate 32.

Still referring to FIG. 3A, the passive thermal switch device 112 is in a thermal insulating state. Specifically, the temperature of the thermal switch material is less than the predetermined state transition temperature such that the thermal switch material is in the antiferromagnetic state. As the permanent magnet 34 of the second plate 32 is not magnetically attracted to the thermal switch material of the first plate 30, the biasing member 140 biases the second plate 32 to be in the thermal insulating position in which the second plate 32 is spaced apart from the first plate 30 by the predetermined distance D2.

As the second plate 32 is spaced apart from the first plate 30 in the thermal insulating position, the amount of thermal energy transfer between the thermal component 14 to the second plate 32, through the first plate 30, is reduced. Therefore, the passive thermal switch device 112 is in the thermal insulating state to allow for thermal energy (i.e. heat) generated by the thermal component 14 be retained by the thermal component 14 to raise the temperature to the predetermined operating temperature.

With reference to FIG. 3B, after operation of the thermal component 14 for a sufficient period of time, the temperature of the thermal component 14 reaches or exceeds the predetermined operating temperature. As the predetermined state transition temperature of the thermal switch material is selected to substantially correspond to the predetermined operating temperature of the thermal component, the thermal switch material of the first plate 30 reaches or exceeds the predetermined state transition temperature.

As shown in FIG. 3B, the passive thermal switch device 112 switches from the thermal insulating state to the thermal conducting state. Specifically, as the temperature of the thermal switch material becomes equal to or greater than the predetermined state transition temperature, the thermal switch material passively switches from the antiferromagnetic state to the ferromagnetic state. As the permanent magnet 34 of the second plate 32 is magnetically attracted to the thermal switch material in the ferromagnetic state, the magnetic attraction overcomes the predetermined biasing force of the biasing member 140, specifically, the resilient elastic material 148. The magnetic attraction between the thermal switch material in the ferromagnetic state and the permanent magnet 34 moves the second plate 32 from the thermal insulator position to the thermal conductor position.

Specifically, the magnetic attraction between the thermal switch material in the ferromagnetic state and the permanent magnet 34 brings the second contact surface 32a of the second plate 32 in contact with the first contact surface 30b of the first plate 30. As the second plate 32 is in contact with the first plate 30, the transfer of thermal energy from the thermal component 14 is increased. Thermal energy from the thermal component is transferred between the first plate 30 to the second plate 32. The thermal energy is transferred through the second plate 32 to the heat sink 36 as the second plate 32 is formed of a material having a high thermal conductivity. The thermal energy is then dissipated by the heat sink 36, so as to maintain the thermal component 14 operating in a predetermined operating temperature range.

Figures 4A, 4B:
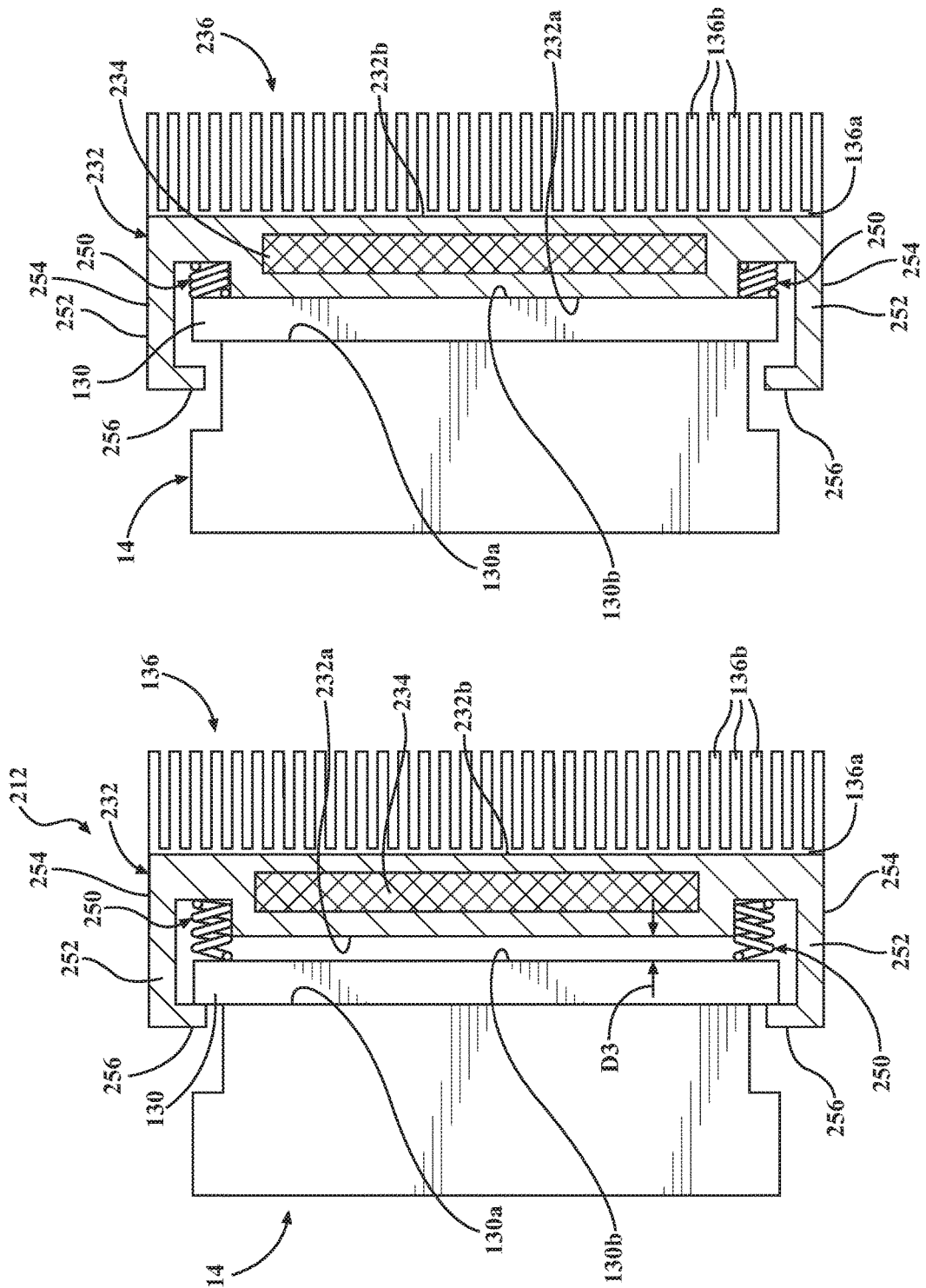
FIG. 4A schematically depicts a partial cross-sectional view of a passive thermal switch device in a thermal insulating state, according to one or more embodiments shown and described herein.
FIG. 4B schematically depicts a partial cross-sectional view of a passive thermal switch device in a thermal conducting state, according to one or more embodiments shown and described herein.

Referring to FIGS. 4A and 4B, a passive thermal switch device for regulating a temperature of a thermal component 14 is generally illustrated at 212. The passive thermal switch device 212 is similar to the passive thermal switch device 12, except that the passive thermal switch device 212 includes a second plate 232 and a biasing member 250.

The second plate 232 includes a second contact surface 232a, an opposite cooling surface 232b, and a permanent magnet 234. The second plate 232 is similar to the second plate 32, except that the second plate 232 includes one or more extensions 252. The extensions 252 extend outwardly from side edges 254 of the second plate 232. The extensions 252 extend beyond the second contact surface 232a of the second plate 232. Provided at distal ends of the extensions 252 are protrusions 256. The protrusions 256 extend inwardly from the side edge 254 towards a center of the second plate 232. The protrusions 256 are provided so as to contact a portion of the attachment surface 30a of the first plate 30.

The biasing member 250 is formed of a spring illustratively including a coil spring. The biasing member 250 is provided so as to have one end in contact with the first contact surface 30b of the first plate 30 and the opposite end in contact with the second contact surface 232a of the second plate 232. Specifically, the biasing member 250 is provided inwardly of the extensions 252. It is appreciated, of course, that the passive thermal switch device 212 includes one or a plurality of biasing members 250 provided at various positions between the first plate 30 and the second plate 232.

With reference to FIG. 4A, the biasing member 250 is biased towards an extended position in which the biasing member 250 exerts a predetermined biasing force to bias the second plate 232 into the thermal insulator position. The biasing member 250 exerts the predetermined biasing force to bias the second plate 232 to be spaced apart from the first plate 30 by a predetermined distance D3. Specifically, the first contact surface 30b of the first plate 30 is spaced apart from the second contact surface 232a of the second plate 232 by the predetermined distance D3.

Still referring to FIG. 4A, the passive thermal switch device 212 is in a thermal insulating state. Specifically, the temperature of the thermal switch material is less than the predetermined state transition temperature such that the thermal switch material is in the antiferromagnetic state. As the permanent magnet 34 of the second plate 232 is not magnetically attracted to the thermal switch material of the first plate 30, the biasing member 250 biases the second plate 232 to be in the thermal insulating position in which the second plate is spaced apart from the first plate 30 by the predetermined distance D3.

In order to maintain the second plate 232 being spaced apart from the first plate 30 by the predetermined distance D3, the protrusions 256 contact a portion of the attachment surface 30a of the first plate 30. Due to the contact between the protrusions 256 and the attachment surface 30a of the first plate 30, the second plate 232 is prevented from being spaced apart a distance greater than the predetermined distance D3.

As the second plate 232 is spaced apart from the first plate 30 in the thermal insulating position, the amount of thermal energy transfer between the thermal component 14 to the second plate 232, through the first plate 30, is reduced. Therefore, the passive thermal switch device 212 is in the thermal insulating state to allow for thermal energy (i.e. heat) generated by the thermal component 14 to be retained by the thermal component 14 to raise the temperature to the predetermined operating temperature.

With reference to FIG. 4B, after operation of the thermal component 14 for a sufficient period of time, the temperature of the thermal component 14 reaches or exceeds the predetermined operating temperature. As the predetermined state transition temperature of the thermal switch material is selected to substantially correspond to the predetermined operating temperature of the thermal component, the thermal switch material of the first plate 30 reaches or exceeds the predetermined state transition temperature.

As shown in FIG. 4B, the passive thermal switch device 212 switches from the thermal insulating state to the thermal conducting state. Specifically, as the temperature of the thermal switch material becomes equal to or greater than the predetermined state transition temperature, the thermal switch material passively switches from the antiferromagnetic state to the ferromagnetic state. As the permanent magnet 234 of the second plate 232 is magnetically attracted to the thermal switch material in the ferromagnetic state, the magnetic attraction overcomes the predetermined biasing force of the biasing member 250. The magnetic attraction between the thermal switch material in the ferromagnetic state and the permanent magnet 234 moves the second plate 232 from the thermal insulator position to the thermal conductor position.

Specifically, the magnetic attraction between the thermal switch material in the ferromagnetic state and the permanent magnet 234 brings the second contact surface 232a of the second plate 232 in contact with the first contact surface 30b of the first plate 30. As the second plate 232 is in contact with the first plate 30, the transfer of thermal energy from the thermal component 14 is increased. Thermal energy from the thermal component 14 is transferred between the first plate 30 to the second plate 232. The thermal energy is transferred through the second plate 232 to the heat sink 36 as the second plate 232 is formed of a material having a high thermal conductivity. The thermal energy is then dissipated by the heat sink 36, so as to maintain the thermal component 14 operating in a predetermined operating temperature range.

Not being bound by theory, one example an estimated of a performance of the passive thermal switch device 12 is the following. For example purposes only, passive thermal switch device 12 includes two biasing member 28 formed of a rubber wire. In general, thermal energy transfer involves three major forms, conduction, convection, and radiation.

In the thermal insulating state of the passive thermal switch device 12, the first plate 30 is spaced apart from the second plate 32 by either air of a vacuum. As such, the conduction heat transfer is mainly contributed by the heat conduction the through the rubber wires.

The heat conduction $C_{cond.}$ is estimated using Figure (1) below:

$$C_{cond.} = \frac{k_{wire} * A_{wire}}{L_{wire} * A_{total}} \qquad (1)$$

In which $k_{wire}$ is the thermal conductivity of the rubber wire, $L_{wire}$ is the length of the rubber wire, $A_{wire}$ is the cross-sectional area of the rubber wire, and $A_{total}$ is the contact area of the second plate 32.

For example purposes only, the thermal conductivity of the rubber wire is $k_{wire}$=0.2 W/mK, the length of the rubber wire is $L_{wire}$=1 mm, the cross-sectional area of the rubber wire is $A_{wire}$=1 mm$^2$, and the total area is $A_{total}$=400 mm$^2$, and the estimation of the heat conduction $C_{cond.}$ is shown in Figure (2) below:

$$C_{cond.} = \frac{0.2\ W/(mK) * 1\ mm^2}{1\ mm * 400\ mm^2} = 0.5 \frac{W}{m^2 K} \qquad (2)$$

The heat convention $C_{conv.}$ is equatable to the heat convention of air, as shown in Figure (3) below:

$$C_{conv.} = \frac{k_{air}}{L_{air}} \qquad (3)$$

In which $k_{air}$ is the thermal conductivity of air and $L_{air}$ is the length of the air between the first plate and the second plate.

For example purposes only, the thermal conductivity of air is $k_{air}$=0.026 W/mK and the length of the air between the first plate 30 and the second plate 32 is $L_{air}$=0.5 mm, the estimation of the heat convection $C_{conv.}$ is shown in Figure (4) below:

$$C_{conv.} = \frac{0.026\ W/(mK)}{0.5\ mm} = 52 \frac{W}{m^2 K} \qquad (4)$$

In an example in which the passive thermal switch device operates within a vacuum, the $C_{conv.}=0$.

The heat radiation $C_{rad.}$ is estimated using Figure (5) below:

$$C_{rad.} = \frac{4\sigma T^3}{19} = 0.32 \frac{W}{m^2 K} \quad (5)$$

In which the Stefan's constant $$\sigma = 5.6703 \times 10^{-8} \frac{W}{m^2 K^4},$$

and T is the temperature of the first plate 30.

For example purposes only, the total conductance of the passive thermal switch device 12 in the thermal insulating state is estimated in Figure 6 below:

$$C_{Total\ Insulator} = C_{cond.} + C_{conv.} + C_{rad.} = \begin{cases} 52.82 \frac{W}{m^2 K} & \text{In Air} \\ 0.82 \frac{W}{m^2 K} & \text{In Vacuum} \end{cases} \quad (6)$$

In the thermal conducting state of the passive thermal switch device 12, the first plate 30 is in contact with the second plate, and the heat transfer is dominated by the heat conduction transfer between the first plate 30 and the second plate 32. Although, the direct amount of heat conduction transfer depends upon the surface flatness, roughness hardness, pressure, the heat conduction $C_{cond.}$ is estimated in Figure (7) below:

$$C_{cond.} \approx 2 \sim 10 \times 10^3 \frac{W}{m^2 K} \quad (7)$$

As convention, radiation, and conduction heat transfer through the rubber wires is negligible when compared to with direction conduction, the total conductance of the passive thermal switch device 12 is estimated in Figure (8) below:

$$C_{Total\ Conductor} \approx C_{cond.} \approx 2 \sim 10 \times 10^3 \frac{W}{m^2 K} \quad (8)$$

Accordingly, the estimated switch ratio (SR) of the passive thermal switch device 12 is estimated using Figure (9) below:

$$SR = \frac{C_{Total\ Conductor}}{C_{Total\ Insulator}} \approx \begin{cases} 35 \sim 200 \frac{W}{m^2 K} & \text{In Air} \\ 2000 \sim 12000 \frac{W}{m^2 K} & \text{In Vacuum} \end{cases} \quad (9)$$

It should now be understood that the passive thermal switch device for regulating a temperature of a thermal component configured to generate heat, includes a first plate and a second plate. The first plate is provided on the thermal component. The first plate includes a thermal switch material that switches from an antiferromagnetic state to a ferromagnetic state upon exceeding a state transition temperature. The second plate includes a permanent magnet. The second plate is moveable between a thermal insulator position and a thermal conductor position based on a temperature of the thermal switch material. In the thermal insulator position, the second plate is spaced apart from the first plate. In the thermal conductor position, the second plate is in contact with the first plate.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A passive thermal switch device for regulating a temperature of a thermal component configured to generate heat, the passive thermal switch comprising:
    a first plate provided on the thermal component, the first plate having a thermal switch material that switches from an antiferromagnetic state to a ferromagnetic state upon exceeding a state transition temperature; and
    a second plate having a permanent magnet, the second plate moveable between a thermal insulator position and a thermal conductor position based on a temperature of the thermal switch material, in the thermal insulator position the second plate is spaced apart from the first plate, and in the thermal conductor position the second plate is in contact with the first plate,
    wherein when the temperature of the thermal switch material is less than the state transition temperature, the thermal switch material is in the antiferromagnetic state and the second plate is spaced apart from the first plate as the permanent magnet of the second plate is not magnetically attracted to the thermal switch material, and
    wherein when the temperature of the thermal switch material is greater than the state transition temperature, the thermal switch material is in the ferromagnetic state and the second plate is in contact with the first plate as the permanent magnet of the second plate is magnetically attracted to the thermal switch material.

2. The vehicle of claim 1, wherein the thermal switch material is selected from the group consisting of manganites, $Mn_{1-x}Fe_xNiGe$ alloys, $Mn_{1-x}Cr_xCoGe$ alloys, $Ni_{50}Mn_{34}In_{16}$ alloys, $CeFe_2$ alloys, $Hf_{0.8}Ta_{0.2}Fe_2$ alloys, FeRh alloys, $Mn_2Sb$ alloys and MnSb alloys.

3. The vehicle of claim 1, wherein the thermal component is an engine.

4. The vehicle of claim 1, wherein the thermal component is an exhaust purification device.

5. The vehicle of claim 1, wherein the thermal component is an electronic power storage device.

6. The vehicle of claim 1, further comprising a heat sink provided on the second plate.

7. The vehicle of claim 1, further comprising a biasing member connected to the first plate and the second plate, the biasing member biases the second plate to be spaced apart from the first plate in the thermal insulator position when the temperature of the thermal switch material is less than the state transition temperature.

8. The passive thermal switch device of claim 7, wherein the biasing member is a spring.

9. The passive thermal switch device of claim 7, wherein the biasing member is formed of a resilient elastic material.

10. A vehicle comprising
a thermal component configured to generate heat; and
a first plate provided on the thermal component, the first plate includes a thermal switch material that switches from an antiferromagnetic state to a ferromagnetic state upon exceeding a state transition temperature; and
a second plate having a permanent magnet, the second plate moveable between a thermal insulator position and a thermal conductor position based on a temperature of the thermal switch material, in the thermal insulator position the second plate is spaced apart from the first plate, and in the thermal conductor position the second plate is in contact with the first plate,
wherein when the temperature of the thermal switch material is less than the state transition temperature, the thermal switch material is in the antiferromagnetic state and the second plate is spaced apart from the first plate as the permanent magnet of the second plate is not magnetically attracted to the thermal switch material, and
wherein when the temperature of the thermal switch material is greater than the state transition temperature, the thermal switch material is in the ferromagnetic state and the second plate is in contact with the first plate as the permanent magnet of the second plate is magnetically attracted to the thermal switch material.

11. The vehicle of claim 10, wherein the thermal switch material is selected from the group consisting of manganites, $Mn_{1-x}Fe_xNiGe$ alloys, $Mn_{1-x}Cr_xCoGe$, $Ni_{50}Mn_{34}In_{16}$ alloys, $CeFe_2$ alloys, $Hf_{0.8}Ta_{0.2}Fe_2$ alloys, FeRh alloys, $Mn_2Sb$ alloys and MnSb alloys.

12. The vehicle of claim 10, wherein the thermal component is an engine.

13. The vehicle of claim 10, wherein the thermal component is an exhaust purification device.

14. The vehicle of claim 10, wherein the thermal component is an electronic power storage device.

15. The vehicle of claim 10 further comprising a heat sink provided on the second plate.

16. The vehicle of claim 10 further comprising a biasing member connected to the first plate and the second plate, the biasing member biases the second plate to be spaced apart from the first plate in the thermal insulator position when the temperature of the thermal switch material is less than the state transition temperature.

17. The vehicle of claim 16, wherein the biasing member is a spring.

18. The vehicle of claim 16, wherein the biasing member is formed of a resilient elastic material.

* * * * *